United States Patent [19]

Simon

[11] Patent Number: 5,575,180
[45] Date of Patent: Nov. 19, 1996

[54] CORE AND CONDUIT SPLICER

[75] Inventor: Edward C. Simon, Garden City, Mich.

[73] Assignee: Teleflex Incorporated, Plymouth Meeting, Pa.

[21] Appl. No.: 439,486

[22] Filed: May 11, 1995

[51] Int. Cl.⁶ .................................................. F16C 1/26
[52] U.S. Cl. .......................................... 74/502.4; 403/329
[58] Field of Search ............................ 74/502.4, 502.6, 74/502; 403/329, 327, 326

[56] References Cited

U.S. PATENT DOCUMENTS

| | | |
|---|---|---|
| 2,586,360 | 2/1952 | Mall . |
| 2,742,622 | 4/1956 | Stevens, Jr. . |
| 2,957,353 | 10/1960 | Babacz . |
| 3,373,397 | 3/1968 | Renshaw, Jr. ................ 403/326 X |
| 3,390,589 | 7/1968 | Tschanz . |
| 4,050,327 | 9/1977 | Thomas et al. . |
| 4,218,935 | 8/1980 | Ion et al. . |
| 4,331,041 | 5/1982 | Bennett ........................ 74/502.4 X |
| 4,511,280 | 4/1985 | Saint-Prix et al. . |
| 4,565,392 | 1/1986 | Vyse ............................. 403/326 X |
| 4,599,913 | 7/1986 | Dawson . |
| 4,658,668 | 4/1987 | Stocker . |
| 4,838,110 | 6/1989 | Koukal et al. . |
| 4,884,468 | 12/1989 | Muramatsu et al. . |
| 4,887,929 | 12/1989 | Hale . |
| 4,917,418 | 4/1990 | Gokee .......................... 74/502.6 X |
| 5,039,138 | 8/1991 | Dickirson ..................... 74/502.6 X |
| 5,261,293 | 11/1993 | Kelley . |

FOREIGN PATENT DOCUMENTS 0106117  5/1987  Japan ................................ 74/502.6

Primary Examiner—Charles A. Marmor
Assistant Examiner—Mary Ann Battista
Attorney, Agent, or Firm—Howard & Howard

[57] ABSTRACT

Each piece of a two-piece motion-transmitting remote-control assembly (10) has an outer end (122, 124) and an inner end (126, 128). The outer ends (122, 124) are attached to different vehicle components and the inner ends (126, 128) are spliced together after vehicle assembly. Each of the two assembly pieces (130, 132) includes a core element segment (16, 18) movably supported within a conduit segment (12, 14). Attached to the inner end (28, 30) of each core segment (16, 18) is a core splicers (48, 50) snap together to connect the core segments (16, 18) into an integral member. A movable tubular sleeve (90) locks the conduit inner ends (20, 22) in a spaced-apart, end-to-end disposition and connects the conduit segments (12, 14) together into an integral member. The sleeve (90) slidably supports the connected core splicers (48, 50) between the spaced-apart conduit inner ends (20, 22). The assembly is shipped with the sleeve (90) moved away to expose the core splicers (48, 50) for connection. To allow conduit length adjustment, a lockable slider (76) is fixed to one conduit inner end (20) and a slider body (78) is disposed about the slider (76).

34 Claims, 3 Drawing Sheets

CORE AND CONDUIT SPLICER

TECHNICAL FIELD

The subject invention relates to a motion-transmitting remote-control assembly of the type for transmitting motion along a curved path by a flexible motion-transmitting core element movably supported by a flexible conduit.

BACKGROUND OF THE INVENTION

Motion-transmitting remote-control assemblies for transmitting motion in a curved path are used in aircraft, automotive, and marine environments. A typical use for such assemblies is to position throttle members in automobiles. In general these assemblies include a flexible tubular conduit movably supporting a flexible motion-transmitting core element with two ends.

Most commonly, the motion-transmitting remote-control assembly is formed as a one piece design, with one end of the assembly connected to a controlling member, e.g., and accelerator pedal, and the other end connected to a controlled member, e.g., a throttle body. In applications such as vehicle engine compartments it is often difficult for assembly line personnel to reach through and around various vehicle components to connect the conduit and core element ends of the one piece assembly to their respective support structures and control linkages after those structures and linkages have already been installed in a vehicle. One way to overcome this difficulty is to form the assembly in two separate pieces having two conduit segments and two core element segments. In this situation each conduit segment is connected to its support structure and each core element segment to its control linkage before installing those structures and linkages in the vehicle. Following installation, the core element segments are later joined together into a single core element and the conduit segments joined into a single conduit.

One reason that the two-piece design overcomes the installation problems associated with the prior art one-piece design is that the two-piece design has only one point of connection after vehicle assembly. It is difficult for an assembler of the one-piece design to take both ends of a single piece assembly and connect each end to its respective support structures and control linkages deep within a crowded engine compartment. It is easier and less time consuming for an assembler to reach and connect the loose ends of an installed two-piece core-cable assembly. It is easier and quicker because the loose ends of an installed two-piece core-cable assembly extend outward from the core-cable assembly mounting points, protrude from between crowded engine compartment structures, and are therefore easier to reach and connect. Easier and quicker assembly reduces assembly line worker fatigue and increases production rate and product quality.

However, state-of-the-art pre-installed two-piece assemblies have an inherent design problem of core element slack. For an assembler to grasp and connect the core element sections of an installed two-piece assembly, the core inner ends must protrude unsheathed from the conduit inner ends. If the core inner ends do not protrude, the assembler cannot grasp and connect them. On the other hand if the core inner ends do protrude, connecting the conduit sections together over the connected unsheathed core sections compresses the connected core sections causing core element slack. Core element slack causes the core element to bend or kink within the connected conduit or at the unsheathed portion of the core between a conduit outer end and a control linkage.

Core element slack is a problem because it prevents a motion-transmitting remote-control assembly from functioning properly. For example, in a "pull-only" assembly such as a spring-return throttle actuator, excessive slack results in poor control response. Poor control response results because control inputs to the core element must first take up the core element slack before transmitting any pulling motion to the controlled member. Moreover, in a "push-pull" control system, core element slack will additionally result in core element kinking and bending under compressive loads—effectively precluding any push force transmission to the controlled member.

Some current two-piece assemblies allow their core element inner ends to protrude for splicing, but are unable to hold their conduit segments in a spaced-apart disposition to preclude core element slack. One example of this type of prior art assembly is shown in U.S. Pat. No. 4,218,935 issued May 16, 1972 to Ion et al. This reference discloses two core segments 22, 24, each movably supported within a respective conduit segment 46, 48. The core segments 22, 24 extend unsheathed from their respective conduit segments 46, 48 to allow access to core splicing means 16. The Ion patent also discloses a conduit coupling means in the form of a coupling nut 50 that clamps the conduit segments 46, 48 together end-to-end in a final operative position. The coupling nut 50 is moveable from an initial assembly position that leaves the protruding core segments 22, 24 exposed for splicing. However, the Ion et al. coupling nut 50 cannot lock its conduit segments 46, 48 into a spaced-apart disposition. The coupling nut 50, in its operative position, pulls the conduit segments 46, 48 together into an abutting end-to-end disposition over the spliced core segments 22, 24. In moving to the operative position, therefore, the coupling nut 50 effectively shortens the overall conduit length without any compensating reduction in core element length. As a result, the combined distance that the core segments 22, 24 protrude unsheathed from the conduit segments 46, 48 with the coupling nut 50 in the initial assembly position, is the amount of core slack that results with the coupling nut 50 in the final operative position.

SUMMARY OF THE INVENTION AND ADVANTAGES

The present invention overcomes these shortcomings by providing a two-piece motion-transmitting remote-control assembly 10 where each assembly piece 130, 132 has an outer end 122, 124 and an inner end 126, 128 and where the outer ends 122, 124 are attached to different vehicle components prior to vehicle component assembly and the inner ends 126, 128 are manually spliced together once the vehicle components are assembled, the assembly comprising:

first 12 and second 14 conduit segments for attachment to respective vehicle components and each having a respective conduit inner end 20, 22;

first 16 and second 18 core element segments movably supported within the respective first 12 and second 14 conduit segments and each having a respective core inner end 28, 30;

core splicing means 46 carried on each of the core inner ends 20, 22 for splicing the core inner ends 20, 22 to one another in end-to-end fashion while extending unsheathed from their respective conduit inner ends 20, 22; and characterized by intermediate conduit locking means 88 moveable from an initial assembly position exposing and allowing access to the core splicing means 46 to a final operative position for locking the conduit inner ends 20, 22 end-to-end and spaced-apart to slidably support the core splicing means 46 between the spaced-apart conduit inner ends 20, 22 while transferring axial loads between the first 12 and second 14 conduit segments thereby connecting the first 12 and second 14 conduit segments into an integral member.

An advantage of this design is that it precludes core slack from forming when the conduit segments are joined into the operative position. By holding the conduit inner ends in a spaced-apart disposition, the conduit locking means does not shorten the overall conduit length when moved to its operative position. The conduit locking means joins the conduit segments into a single operative unit without shortening the overall coupled conduit length in relation to the overall coupled core element length. Therefore, the coupled core element is not axially compressed when the conduit sections are joined together and no core element slack results.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
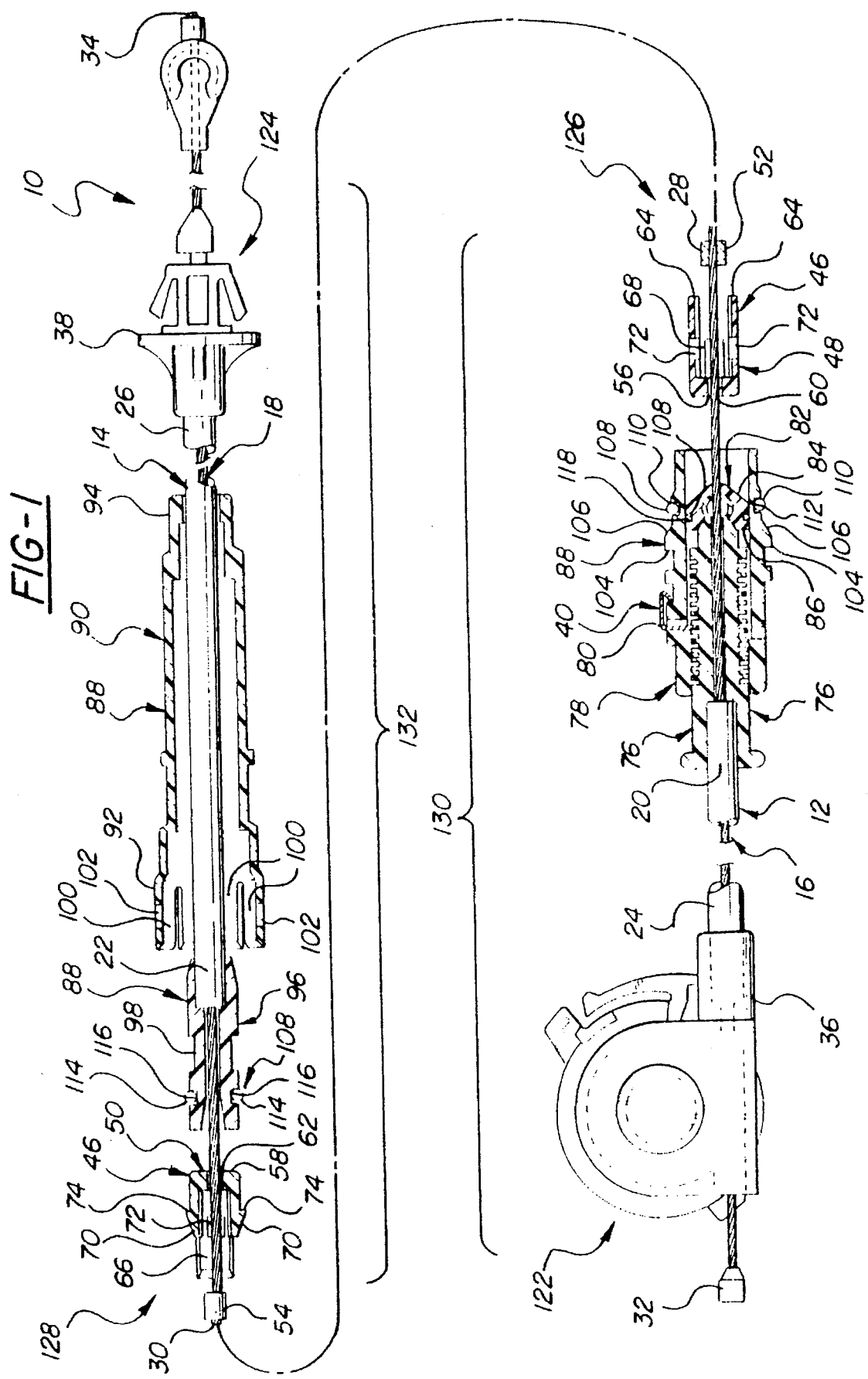
FIG. 1 is a cross-sectional front view of the invention in its initial assembly position.
Figure 2:
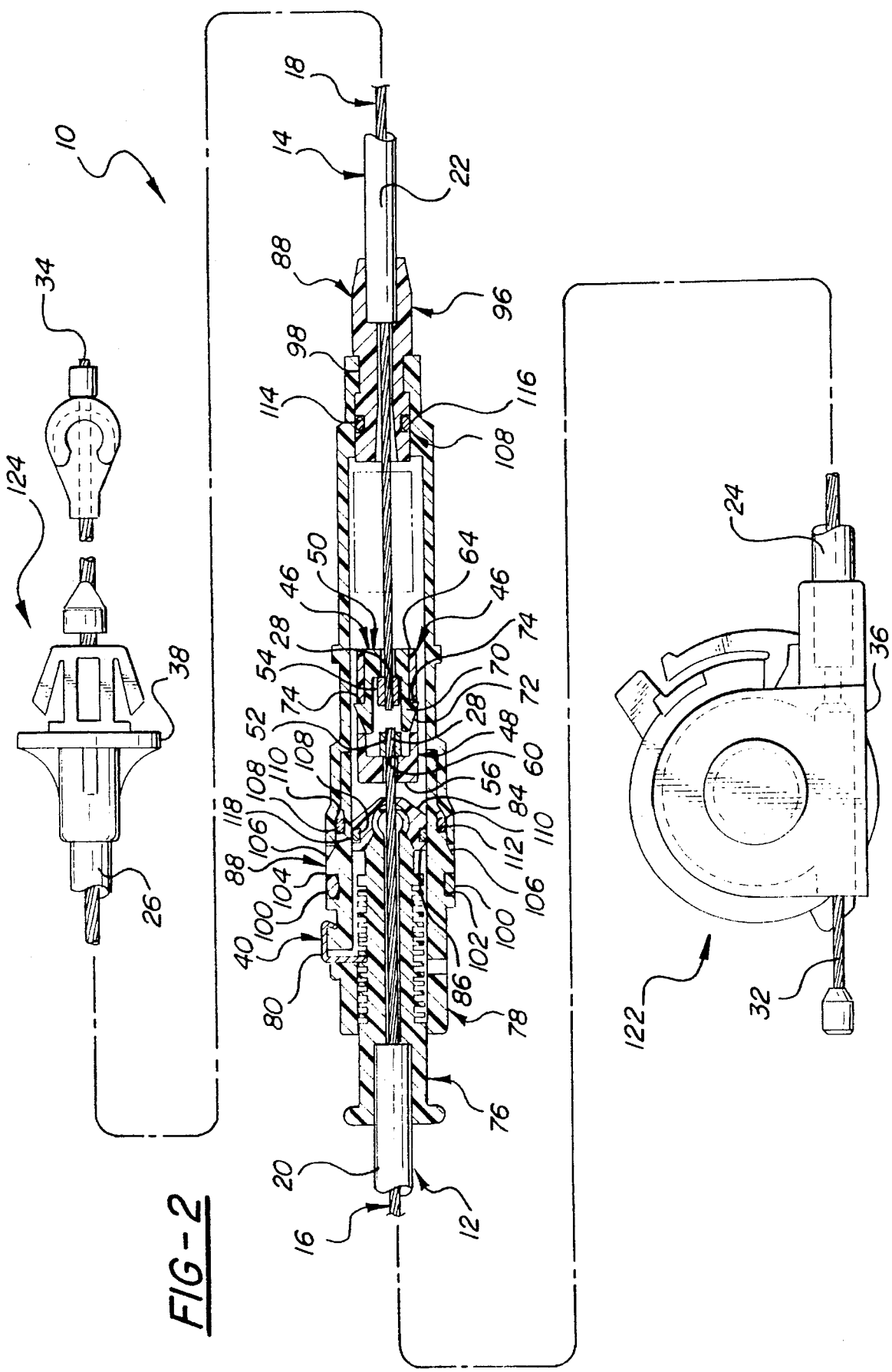
FIG. 2 is a cross-sectional front view of the invention in its final operative position.

Referring now to FIGS. 1 and 2, the preferred embodiment of a motion transmitting remote control assembly constructed in two pieces 130, 132 is generally shown at 10. Each piece of the two-piece motion-transmitting remote-control assembly 10 has an outer end 122, 124 and an inner end 126, 128. The outer ends 122, 124 are attached to different vehicle components and the inner ends 126, 128 are spliced together after vehicle assembly. Each of the two assembly pieces 130, 132 includes a core element segment 16, 18. The two assembly pieces 130, 132 also include, respectively, first 12 and second 14 conduit sections. The first 12 and second 14 conduit sections movably support their respective first 16 and second 18 core element sections. The core element sections 16, 18 have lengths and central axes, with the respective conduit section 12, 14 and core element 16, 18 axes being generally coincidental, and for all practical purposes, the same axes. The first 12 and second 14 conduit sections each have respective inner 20, 22 and outer 24, 26 ends. The first 16 and second 18 core element sections also have respective inner 28, 30 and outer 32, 34 ends. Also, first 36 and second 38 conduit end fittings are secured to each conduit section 12, 14 and are adapted for attachment to respective support structures (not shown). Normally fittings 36, 38 will be disposed at the outer end 24, 26 of each respective conduit section 12, 14. In the preferred embodiment the first conduit end fitting 36 includes a D-shaped servo housing adapted to attach to a cruise control stepper motor housing. Also in the preferred embodiment, the second conduit end fitting 38 is adapted for force-fit snapping engagement into a bracket (not shown) secured just short of a carburetor throttle body. The outer end 32 of the first core section 16 passes through the end fitting and servo housing 36 and operatively connects to a cruise control stepper motor. The outer end 34 of the second core section 18 includes a carburetor snap-on fitting adapted to operatively connect to an automotive throttle body (not shown). The conduit sections 12, 14 are preferably of the known type used in remote control assemblies including an inner tubular member over an organic polymeric material surrounded by a plurality of filaments or long lay wires disposed on a long lead and encased in an outer jacket of organic polymeric material. The organic polymeric material may be of the various known plastics such as polyethylene etc. Additionally, the fittings 36, 38 are preferably of organic polymeric material and are disposed about the conduit sections 12, 14.

The first conduit segment 12 includes adjustment means, generally indicated at 40, for adjusting the relative lengths between the connected core element sections 16, 18 and the connected conduit sections 12, 14. In the embodiment of FIGS. 1–2, the adjustment means 40 accomplishes this relative length adjustment by allowing the length of the connected conduit sections 12, 14, i.e., the distance between attachment points at each end of the conduit sections 12, 14, to be shortened or elongated depending on the need. Obviously, the adjustment means 40 could be used to adjust the length of the connected core sections 16, 18 in an alternative embodiment. The adjustment means 40 accomplishes the effective length adjustment by allowing the length of the connected conduit sections, to be shortened or elongated depending on need. According to the subject invention, the adjustment means 40 is of the manual type, as distinguished from the automatic, or self-adjust type. Hence, the adjustment means 40 is maintained in an unlocked condition, moved to a correctly adjusted position, then manually locked into the adjusted position.

The fittings 36, 38 attach to different vehicle support structures (not shown) prior to the support structures' assembly into the vehicle. "In the preferred embodiment, the first fitting 36 comprises a servo housing. The second fitting 38 comprises a carburetor snap end fitting with an attached wiper cap."

The core section outer ends 32, 34 attach to different control linkages (not shown) prior to the control linkages' assembly into the vehicle. The core segments' inner ends 28, 30 are manually spliced together and the conduit segments' inner ends 20, 22 are manually spliced together once the vehicle components are assembled.

In the preferred embodiment, one of the core outer ends 32, 34 is connected via a control linkage to a controlled device such as a throttle or transmission shift mechanism (not shown). The other of the core outer ends 32, 34 is connected via a control linkage to a controlling device such as an accelerator pedal or a transmission shift lever (not shown).

The assembly includes core splicing means, generally shown at 46 in FIGS. 1–5. The core splicing means 46 comprise first 48 and second 50 core splicers, each carried on one of the core inner ends 28, 30. The core splicers 48, 50 are adapted to allow an installer to splice the core inner ends 28, 30 to one another in end-to-end fashion while the core inner ends 28, 30 are extending unsheathed from their respective conduit inner ends 20, 22.

Figure 3:
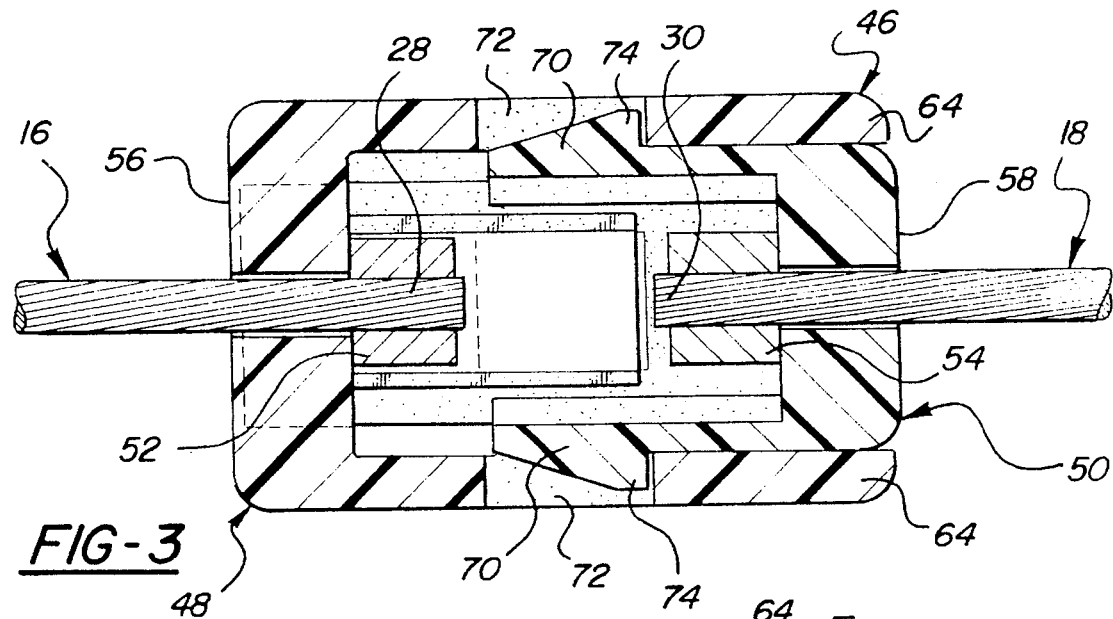
FIG. 3 is an enlarged cross-sectional front view of the core splicing means.

The core splicing means 46 include first 52 and second 54 retaining slugs as shown in FIGS. 1–3. The retaining slugs 52, 54 retain the core splicers 48, 50 on the core inner ends 28, 30. The retaining slugs 52, 54 are fixed to the respective first 28 and second 30 core element inner ends. In the preferred embodiment these slugs 52, 54 are solid cylindrical metallic masses coaxially fixed to the core element inner ends 28, 30.

As is best shown in FIGS. 1, 2 and 3, the first 48 and second 50 core splicers are slidably disposed on the respective first 28 and second 30 core inner ends adjacent the respective first 52 and second 54 retaining slugs. The retaining slugs 52, 54 prevent the core splicers 48, 50 from sliding off the core element inner ends 28, 30.

The first 48 and second 50 core splicers include respective first and second annular bases best shown at 56 and 58 in FIG. 3. The annular bases 56, 58 are disposed around the respective first 28 and second 30 core element inner ends as shown in FIGS. 1, 2 and 3. The first 56 and second 58 annular bases include respective first 60 and second 62 through-holes, best shown in FIG. 5. The respective first 52 and second 54 retaining slugs have diameters greater than the through-hole diameters. Because the slug diameters are larger than the bases' through-hole diameters, the slugs 52, 54 physically prevent the core splicers 48, 50 from sliding off their respective core inner ends 28, 30.

Figure 4:
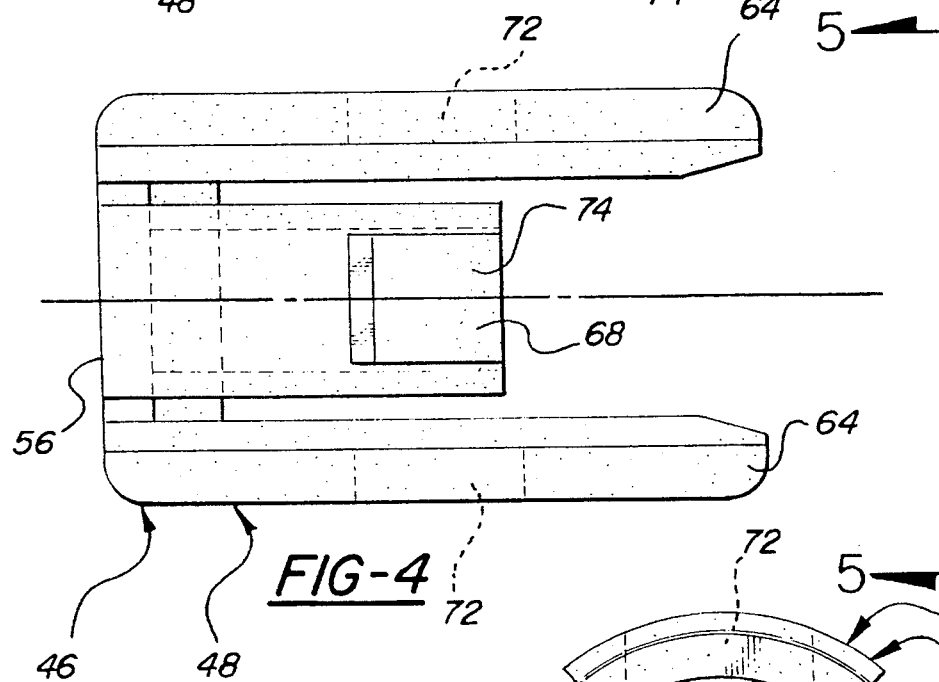
FIG. 4 is a front view of one core splicer.
Figure 5:
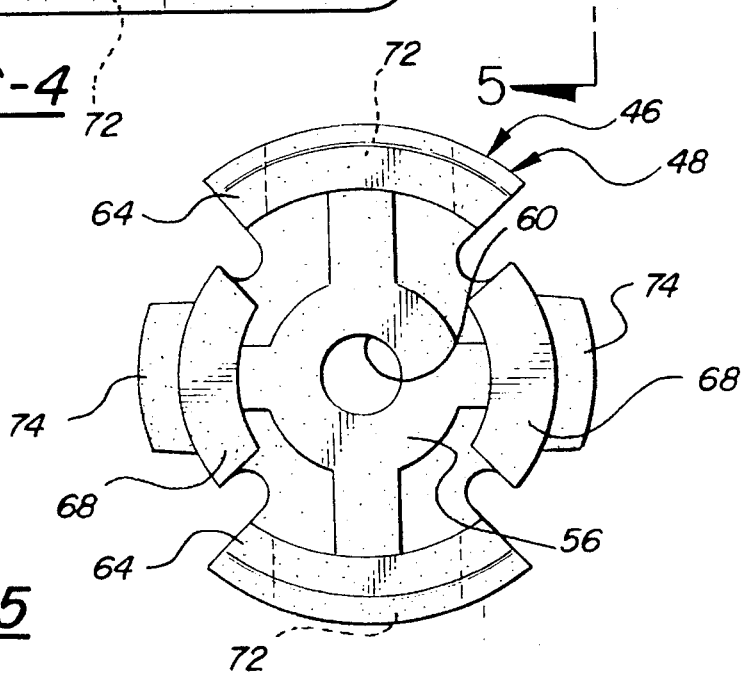
FIG. 5 is an end view of, the core splicer of FIG. 4 taken along line 5—5 of FIG. 4.

The core splicers 48, 50 are adapted for force-fit snapping engagement to one another. In the preferred embodiment, each of the core splicers 48, 50 has a first pair of diametrically-opposed flexible legs 64, 66 axially and integrally extending from its respective the annular base. The first core splicer's first pair of legs 64 is best shown in FIG. 3. Each of the core splicers 48, 50 also has a second pair of diametrically-opposed flexible legs 68, 70 axially and integrally extending from its respective annular base 56, 58. The first core splicer's second pair of legs 68 are best shown in FIGS. 3 and 4. The first pair of legs 64, 66 of each of the core splicers 48, 50 is adapted to engage the second pair of legs 68, 70 of the other core splicer 48, 50. This engaged position is best shown in FIG. 3. The disengaged core splicers 48, 50 are best shown in FIG. 1.

Each core splicer 48, 50 includes a female core-engagement detent, best shown at 72 in FIG. 3. One female core-engagement detent 72 is disposed in each leg of the first pair of legs 64, 66 for each core splicer 48, 50. Each core splicer 48, 50 also includes a male core-engagement detent, best shown at 74 in FIG. 3. A male core-engagement detent is disposed in each leg of the second pair of legs 68, 70. In the preferred embodiment, the male core-engagement detents 74 extend integrally outward from each second pair of legs 68, 70. The male detents 74 snap outwardly into engagement with the female core-engagement detents 72 when the core splicers 48, 50 are pressed axially together. In the preferred embodiment, the core splicers 48, 50 are identical to one another and are therefore interchangeable.

The first conduit segment 12 includes an integral adjustment means, generally indicated at 40 in FIGS. 1 and 2. The adjustment means 40 is disposed adjacent the first conduit segment inner end 20. The adjustment means 40 includes a lockable slider, generally indicated at 76 in FIGS. 1 and 2, that is fixed to the first conduit inner end 20. A slider body, generally indicated at 78 in FIGS. 1 and 2, has a generally cylindrical shape and is rotatably and slidably disposed about the slider 76. The slider 76 comprises an elongated shaft with at least one row of teeth 78 extending integrally outward along its length. The slider body 78 has an inner diameter and the slider 76 has an outer diameter slightly smaller than the slider body 78 inner diameter. The slider 76 has a slider through-bore along its central axis. The first core element segment 16 extends slidably through the slider through-bore.

The adjustment means 40 includes a retainer clip 80, best shown in FIGS. 1 and 2, that is disposed adjacent the slider 76 and slidably mounted in an opening in the slider body 78. The retainer clip 80 is moveable to an engaged position for locking the slider 76 to the slider body 78 and preventing relative axial movement between them. In its engaged position the retainer clip 80 engages the slider teeth 78 and prevents the slider 76 from moving longitudinally within the slider body 78. In a disengaged position, the retainer clip 80 permits the slider 76 to slide freely within the slider body 78.

The adjustment means 40 includes a wiper cap, generally indicated at 82 in FIGS. 1 and 2. The wiper cap 82 is attached to the slider 78 and is disposed within the slider body 78. The wiper cap includes a conical cap 84 and an annular disk-shaped base 86. The wiper cap has a wiper through-bore. The first core element segment 16 extends slidably through the slider through-bore. The base 86 has an outer diameter slightly smaller than the slider body 78 inner diameter.

Characterizing the invention are intermediate conduit locking means, generally indicated at 88 in FIGS. 1 and 2. The assembly 10 is shipped with the intermediate conduit locking means 88 disposed in an initial assembly position illustrated in FIG. 1. In its initial assembly position the intermediate conduit locking means 88 leaves the core element inner ends 28, 30 and the core splicing means 46 exposed. Because the core splicing means 46 and core inner ends 28, 30 are exposed, an assembler may reach them and splice the core element inner ends 28, 30 together. The intermediate conduit locking means 88 is then movable to a final operative position surrounding the core splicing means 46 and core inner ends 28, 30 as illustrated in FIG. 2. In this final operative position, the intermediate conduit locking means 88 lock the conduit inner ends 20, 22 in an end-to-end and spaced-apart disposition. Also, in its operative position, the intermediate conduit locking means 88 slidably supports the connected core splicing means 46 between the spaced-apart conduit inner ends 20, 22 and transfers axial loads between the first 12 and second 14 conduit segments. In other words, the intermediate conduit locking means 88 connects the first 12 and second 14 conduit segments into an integral member.

The conduit locking means 88 includes an elongated tubular sleeve, generally indicated at 90 in FIGS. 1 and 2, with first 92 and second 94 sleeve ends. In the preferred embodiment, the sleeve 90 is slidably disposed around the second conduit segment 14 in the initial assembly position. Also in the preferred embodiment, the sleeve 90 has a diameter large enough to enclose and slidably support relatively large-diameter core splicers 48, 50.

The preferred embodiment is intended for pull-only applications with spring-return mechanisms. With this type of application, the core element is always in tension. Because the flexible connected core element segments 16, 18 are always in tension, there is no need to constrain them against the lateral bending that would occur under compressive axial loads. In other words, there is no need to ensure that the inner diameters of the conduit segments 12, 14 are only slightly greater than the outer diameters of the core segments 16, 18 over the entire length of the connected core element segments 16, 18. This means that the tubular sleeve 90 may have an inner diameter significantly greater than the outer diameters of the core segments 16, 18. Consequently, in a pull-only application there is no need to expend additional time, effort and expense to design and manufacture core splicers 48, 50 small enough to travel within small-diameter conduit sections 12, 14. In addition, with the preferred embodiment's large-diameter sleeve design, the core splicers 48, 50 may be larger and therefore easier to grasp and interconnect. In other words, the present invention allows for a sleeve 90 with sufficiently large diameter to slidably accommodate large-diameter core splicers 48, 50.

When the sleeve 90 is slid into its final operative position, the first sleeve end 92 locks to the first conduit inner end 20 and the second sleeve end 94 locks to the second conduit inner end. In the preferred embodiment the first 92 and second 94 sleeve ends are rotatably lockable to the respective first 20 and second 22 conduit inner ends.

In the preferred embodiment, the conduit locking means 88 also includes a sleeve-connector ferrule, generally indicated at 96 in FIGS. 1 and 2. The ferrule 96 is fixed to the second conduit inner end 22. The sleeve second end 94 is adapted for sliding into force-fit snapping engagement over the ferrule 96. The ferrule 96 has an outer diameter greater than the inner diameter of the sleeve second end 94. The ferrule 96 also has a circumferential sleeve-engagement channel 98 with a generally rectangular cross-section. The outer diameter of the sleeve-engagement channel 98 is approximately the same as the inner diameter of the sleeve second end 94. The inner surface of the sleeve second end 94 is shaped to mate with the sleeve-engagement channel 98 of the ferrule 96. One end of the ferrule 96 is tapered to allow an assembler to force the sleeve second end 94 over the ferrule 96 to snap into the sleeve-engagement channel 98.

Referring again to FIGS. 1 and 2, the first sleeve end 92 includes circumferentially-disposed and axially-extending flexible fingers 100. A female conduit-engagement detent 102 is disposed in each flexible finger 100. The first conduit segment 12 includes male conduit-engagement detents 104 integrally and radially extending from the first conduit inner end 20. In the preferred embodiment, the male conduit-engagement detents 104 protrude integrally outward from the adjustment means slider body 78. The male engagement detents 104 include ramps 106. When an assembler slides the sleeve 90 toward its final operative position, the ramps 106 engage the leading edges of the flexible fingers 100 causing the flexible fingers 100 to splay radially outward. When the sleeve 90 reaches its final operative position, the female conduit engagement detents 102 are positioned over the male detents 104 and allow the flexible fingers 100 to snap inward into force-fit snapping engagement.

Sealing means, generally indicated at 108 in FIGS. 1 and 2, are disposed between the conduit locking means 88 and the first 20 and second 22 conduit inner ends. More specifically, the sealing means 108 includes at least two seals 110, 112. One seal disposed between the first sleeve end 92 and the first conduit inner end 20 and another seal disposed between the second sleeve end 94 and the second conduit inner end 22.

The preferred embodiment, however, includes three O-ring seals. The first of these three seals is an O-ring slider body seal with a circular cross-section, shown at 110 in FIGS. 1 and 2. The slider body seal 110 is disposed between the first sleeve end 92 and the adjuster means slider body 78. The slider body 78 has an outer circumferential slider body seal channel 112 with a rectangular cross section. The slider body seal 110 seats in the channel 112 and protrudes radially outward beyond the outer circumference of the slider body 78. When the sleeve 90 is moved to its final operative position over the slider body 78 the slider body seal 110 is compressed into sealing engagement between the slider body seal channel 112 and the sleeve first end 92. In the preferred embodiment the slider body seal 110 is made of an elastomeric polymeric material.

The second of the three seals is an O-ring ferrule seal with a circular cross-section as is shown at 114 in FIGS. 1 and 2. The ferrule seal 114 is disposed between the second sleeve end 94 and the ferrule 96. The ferrule 96 has a circumferential seal channel 116 with a rectangular cross section. When the ferrule seal 114 seated in the channel 116 and the sleeve 90 is snapped into its final operative position over the ferrule 96 the ferrule seal 114 protrudes radially beyond the circumference of the ferrule 96 and is compressed into sealing engagement between the ferrule seal channel 116 and the second sleeve end 94. In the preferred embodiment the ferrule seal 114 is made of an elastomeric polymeric material.

The last of the three seals found in the preferred embodiment is an O-ring slider seal with a rectangular cross-section as is shown at 118 in FIGS. 1 and 2. The slider seal 118 is disposed between the slider body 78 and the slider 76. In the preferred embodiment, the slider seal 118 is disposed within a circumferential slider seal channel around the wiper cap base 86. The slider seal channel has a rectangular cross-section. When the slider seal 118 is seated in the channel it protrudes radially beyond the circumference of the wiper cap base 86 and is compressed into slidable sealing engagement between the wiper cap channel and the slider body 78. The slider seal 118 is made of polytetrafluoroethylene (TFE)— a substance commonly associated with the DuPont TEFLON trade mark.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A two-piece motion-transmitting remote-control assembly (10) where each assembly piece (130, 132) has an outer end (122, 124) and an inner end (126, 128) and where the outer ends (122, 124) are attached to different vehicle components prior to vehicle component assembly and the inner ends (126, 128) are manually spliced together once the vehicle components are assembled, the assembly comprising:

first (12) and second (14) conduit segments for attachment to respective vehicle components and each having a conduit inner end (20, 22);

first (16) and second (18) core element segments movably supported within respective said first (12) and second (14) conduit segments and each having a respective core inner end (28, 30);

core splicing means (46) carried on each of said core inner ends (20, 22) for splicing said core inner ends (20, 22) to one another in end-to-end fashion while extending unsheathed from their respective said conduit inner ends (20, 22); and characterized by intermediate conduit locking means (88) moveable relative to each of said conduit inner ends (20, 22) from an initial assembly position exposing and allowing access to said core splicing means (46) to a final operative position for locking said conduit inner ends (20, 22) end-to-end and spaced-apart to slidably support said core splicing means (46) between said conduit inner ends (20, 22) while transferring axial loads between said first (12) and second (14) conduit segments thereby connecting said first (12) and second (14) conduit segments into an integral member.

2. A motion-transmitting remote-control assembly (10) as set forth in claim 1, where said conduit locking means (88) includes an elongated tubular sleeve (90) with first (92) and second (94) sleeve ends.

3. A motion-transmitting remote-control assembly (10) as set forth in claim 2, where said sleeve (90) is slidably disposed around said second conduit segment (14) in said initial assembly position.

4. A motion-transmitting remote-control assembly (10) as set forth in claim 3, where said first (92) and second (94) sleeve ends are lockable to said respective first (20) and second (22) conduit inner ends.

5. A motion-transmitting remote-control assembly (10) as set forth in claim 4, where said first (92) and second (94) sleeve ends are rotatably lockable to said respective first (20) and second (22) conduit inner ends.

6. A motion-transmitting remote-control assembly (10) as set forth in claim 4, where said conduit locking means (88) includes a sleeve-connector ferrule (96) fixed to said second conduit inner end (22).

7. A motion-transmitting remote-control assembly (10) as set forth in claim 6, where said second sleeve end (94) is adapted for sliding into force-fit snapping engagement over said ferrule (96).

8. A motion-transmitting remote-control assembly (10) as set forth in claim 7, including an O-ring ferrule seal (114) disposed between said second sleeve end (94) and said ferrule (96).

9. A motion-transmitting remote-control assembly (10) as set forth in claim 2, including sealing means (108) disposed between said conduit locking means (88) and said first (20) and second (22) conduit inner ends.

10. A motion-transmitting remote-control assembly (10) as set forth in claim 9, where said sealing means (108) includes seals disposed between said first sleeve end (92) and said first conduit inner end (20) and between said second sleeve end (94) and said second conduit inner end (22).

11. A motion-transmitting remote-control assembly (10) as set forth in claim 10, where said sealing means (108) comprises a first (110) and a second O-ring (114).

12. A motion-transmitting remote-control assembly (10) as set forth in claim 11, where said first (110) and second (114) O-rings are made of an elastomeric material.

13. A motion-transmitting remote-control assembly (10) as set forth in claim 9, where said first sleeve end (92) includes circumferentially-disposed and axially-extending flexible fingers (100).

14. A motion-transmitting remote-control assembly (10) as set forth in claim 13, where said first sleeve end (92) includes a female conduit-engagement detent (102) disposed in each of said flexible fingers (100).

15. A motion-transmitting remote-control assembly (10) as set forth in claim 14, where said first conduit segment (12) includes male conduit-engagement detents (104) integrally extending from said first conduit inner end (20).

16. A motion-transmitting remote-control assembly (10) as set forth in claim 15, where said first conduit segment (12) includes adjustment means (40).

17. A motion-transmitting remote-control assembly (10) as set forth in claim 16, where said adjustment means (40) includes a lockable slider (76) fixed to said first conduit inner end (20).

18. A motion-transmitting remote-control assembly (10) as set forth in claim 17, where said adjustment means (40) includes a slider body (78) rotatably and slidably disposed about said slider (76).

19. A motion-transmitting remote-control assembly (10) as set forth in claim 18, where said adjustment means (40) includes a retainer clip (80) disposed adjacent said slider (76) and said slider body (78).

20. A motion-transmitting remote-control assembly (10) as set forth in claim 18, where said male conduit-engagement detents (104) protrude integrally outward from said adjustment means slider body (78).

21. A motion-transmitting remote-control assembly (10) as set forth in claim 18, where said sealing means (108) comprises a seal (110) disposed between said first sleeve end (92) and said adjustment means slider body (78).

22. A motion-transmitting remote-control assembly (10) as set forth in claim 21, where said sealing means (108) includes a slider seal (118) between said slider body (78) and said slider (76).

23. A motion-transmitting remote-control assembly (10) as set forth in claim 22, where said slider seal is a polytetrafluoroethylene ring.

24. A motion-transmitting remote-control assembly (10) as set forth in claim 1, where said core splicing means (46) includes first (52) and second (54) retaining slugs fixed to said respective first (28) and second (30) core [element]inner ends.

25. A motion-transmitting remote-control assembly (10) as set forth in claim 24, Where said core splicing means (46) includes first (48) and second (50) core splicers slidably disposed on said respective first (28) and second (30) core inner ends adjacent said respective first (52) and second (54) retaining slugs.

26. A motion-transmitting remote-control assembly (10) as set forth in claim 25, where said core splicers (48, 50) are identical.

27. A motion-transmitting remote-control assembly (10) as set forth in claim 25, where said core splicers (48, 50) are adapted for force-fit snapping engagement to one another.

28. A motion-transmitting remote-control assembly (10) as set forth in claim 27, where said first (48) and second (50) core splicers include respective first (56) and second (58) annular bases disposed around said respective first (28) and second (30) core inner ends.

29. A motion-transmitting remote-control assembly (10) as set forth in claim 28, where said first (56) and second (58) annular bases include respective first and second through-hole diameters and where said respective first (52) and second (54) retaining slugs have respective first and second slug diameters greater than said respective first and second through-hole diameters.

30. A motion-transmitting remote-control assembly (10) as set forth in claim 29, where each of said core splicers (48, 50) has a second pair of diametrically-opposed flexible legs (68, 70) axially and integrally extending from said respective first and second annular bases (56, 58).

31. A motion-transmitting remote-control assembly (10) as set forth in claim 30, where each of said core splicers (48, 50) has a second pair of diametrically-opposed flexible legs (68, 70) axialy and integrally extending from said respective first and second annular bases (56, 58).

32. A motion-transmitting remote-control assembly (10) as set forth in claim 30, where said first pair of legs (64, 66)

of each of said core splicers (48, 50) is adapted to engage said second pair of legs (68, 70) of the other of said core splicers (48, 50).

33. A motion-transmitting remote-control assembly (10) as set forth in claim 32, where each of said core splicers (48, 50) includes a female.

34. A motion-transmitting remote-control assembly (10) as set forth in claim 33, where each of said core splicers (48, 50) includes a male core-engagement detent (74) disposed in each leg of said second pair of legs (68, 70).

* * * * *

UNITED STATES PATENT AND TRADEMARK OFFICE
CERTIFICATE OF CORRECTION

PATENT NO. : 5,575,180

DATED : Nov. 19, 1996

INVENTOR(S) : Edward C. Simon

It is certified that error appears in the above-indentified patent and that said Letters Patent is hereby corrected as shown below:

Claim 24, column 10, line 30 after "core" delete --[element]--

Claim 25, column 10, line 33, after "24," delete --Where-- and insert "where"

Claim 33, column 11, line 6, after "female" delete --.-- and insert "core-engagement detent (72) disposed in each leg of said first pair of legs (64, 66)."

Signed and Sealed this

Twenty-second Day of July, 1997

Attest:

BRUCE LEHMAN

*Attesting Officer*     Commissioner of Patents and Trademarks